United States Patent [19]
Ell et al.

[11] Patent Number: 4,691,152
[45] Date of Patent: Sep. 1, 1987

[54] DATA DISK DRIVE VELOCITY ESTIMATOR

[75] Inventors: Travis E. Ell; Jeff Stephenson, both of Rochester, Minn.

[73] Assignee: International Business Machines Corporation, Armonk, N.Y.

[21] Appl. No.: 830,618

[22] Filed: Feb. 19, 1986

[51] Int. Cl.⁴ .............................................. G11B 21/08
[52] U.S. Cl. ..................................... 318/616; 318/561; 360/78
[58] Field of Search ............... 318/616, 615, 617, 611, 318/632, 561; 360/75, 77, 78

[56] References Cited

U.S. PATENT DOCUMENTS

| | | | |
|---|---|---|---|
| 3,805,137 | 4/1974 | Fahrner | 318/616 |
| 4,263,627 | 4/1981 | Rose | 318/561 |
| 4,288,731 | 9/1981 | Lee | 318/561 |
| 4,321,517 | 3/1982 | Touchton | 318/616 |
| 4,575,776 | 3/1986 | Stephens | 318/561 |
| 4,594,622 | 6/1986 | Wallis | 318/561 |

OTHER PUBLICATIONS

IBM Technical Disclosure Bulletin, J. W. Reed, vol. 19, No. 5, Oct. 1976, p. 1884.
IBM Technical Disclosure Bulletin, A. J. Betts and P. A. Gardner, vol. 18, No. 1, Jun. 1975, pp. 267–269.

Primary Examiner—Bernard Roskoski
Assistant Examiner—Patrick C. Keane
Attorney, Agent, or Firm—Robert W. Lahtinen

[57] ABSTRACT

A velocity estimator for a voice coil motor driven actuator is implemented by integrating coil current to generate the estimated velocity and integrating the estimated velocity signal to produce an estimated position signal. The estimated position signal and a measured position signal are compared and the derived error signal is applied as negative feedback to the summing junctions at the inputs of each of the integrators. The use of an integrated signal results in reduced noise influence on the position error signal which, in the environment of a data disk drive, results in more reliable recording of track crossings and the ability to meet rigid product specifications using simple servo patterns.

7 Claims, 4 Drawing Figures

DATA DISK DRIVE VELOCITY ESTIMATOR

Background of the Invention

This invention pertains to a system for controlling the position or velocity of an electrically driven device and more particularly to a velocity estimator for use in such applications.

As data storage disk drives are developed to have increasing storage densities, concentric track densities are correspondingly increased. The accessing of the narrower tracks by the transducer carrying actuator must be made with correspondingly greater precision. Concurrently there are demands for reduced access times that make the design problems even more complex as the track to track movement time must be minimized.

To control the 'seek' (movement from one track to another) of a disk file actuator carriage system, the velocity of the carriage must be controlled. Therefore the velocity must be either measured directly or estimated using coil current, track position information or both. Many current disk file products use a design which differentiates the PES (position error signal) while it is in its linear region; integrates the coil current while the PES is in the non-linear region and then mixes the two values in such a way as to generate a velocity estimate. While this method has been successfully used, it suffers from a number of problems which the present invention has sought to overcome.

The majority of velocity estimators or tachometers in use today generate the velocity estimate by differentiating the PES. These differentiating type estimators are very sensitive to electrical noise and therefore frequently use variable bandwidth low pass filters to reduce electrical noise on the PES. Further, mechanical resonances may become excited while seeking which could cause the differentiator type estimator to generate a more inaccurate velocity. Avoidance of this problem has also caused a low pass filter network to be implemented on some estimators so that the major contribution to the velocity estimate is the differentiation at low frequency and the integration of voice coil current at high frequencies.

PES gain is a function of servo head width and the PES demodulator. This gain is usually expressed in units of volts per micron. A differentiator type estimator produces a velocity which is directly related to this gain therefore any error in the PES gain will result in an equal percent error in the velocity. Files with dedicated servo systems use measured PES as the means of counting track crossings and determining the linear region boundaries. This causes problems because disk defects can impose noise spikes on the signal causing extra or missing track crossings or false linear region signals.

SUMMARY OF THE INVENTION

The estimator of this invention integrates the voice coil current to obtain a velocity estimate and integrates the velocity to generate an estimated PES. The measured position is then compared to the estimated PES and an error signal created that is fed back in the circuit to correct the estimated velocity.

The estimator, by generating the estimated velocity signal using integration of the voice coil current rather than differentiation of a position signal, is much more immune to noisy PES signals and therefore does not require low pass filters on the PES. The estimator also does not require the complex mixing of the differentiation of the PES and integration of the coil current and is therefore simpler and more economical. The estimator's velocity signal is not directly related to PES gain and so has much less sensitivity to PES gain variations. The estimator generates an estimated PES which tracks the measured PES, but at a lower frequency so that spikes on the measured PES are filtered out. Therefore using the estimated PES as the track crossing and linear region signal provides a more reliable signal.

Since PES gain variations don't affect the accuracy of the velocity estimate as profoundly as it does differentiator type estimators, less control of the PES gain is required. In other file devices potentiometers or clipping resistors are required to tightly control PES gain. Although accuracy is improved if PES gain is controlled with this estimator, its tolerance can be wider and so less costly methods of PES gain control can be implemented. Since error feed back corrects for estimator inaccuracies, parts which are different from nominal don't have a one for one effect on the estimator accuracy and so sensitivity to component aging and manufacturing tolerance are reduced.

Previously, servo disks had a different single disk test specification because a higher quality disk surface was required for the servo system. Since this estimator generates an estimated PES that does not follow glitches due to surface defects of the measured PES, the standard data disk specification can be used for the servo disk. Also, an economic advantage is achieved since changes in mechanical parameters (e.g. force constant, mass, servo head width and PES gain) are easily implemented (usually with only a one resistor change). Also new file developments can use the same integrated circuit since the gain changes are external resistors. This can result in a significantly shortened time period between design and working hardware.

This invention is particularly applicable in the environment of a rotary actuator. Such actuators in general have resonances which are lower in frequency than linear actuators. The benefits of balanced rotary actuators is that they can usually fit in a smaller package, are more immune to external forces such as impacts and gravity, and usually cost less because a way system for guiding the carriage is not needed. This means that an estimator that works in the environment of a rotary actuator will allow a smaller, vibration resistant and lower cost mechanical option.

DETAILED DESCRIPTION

Figure 1:
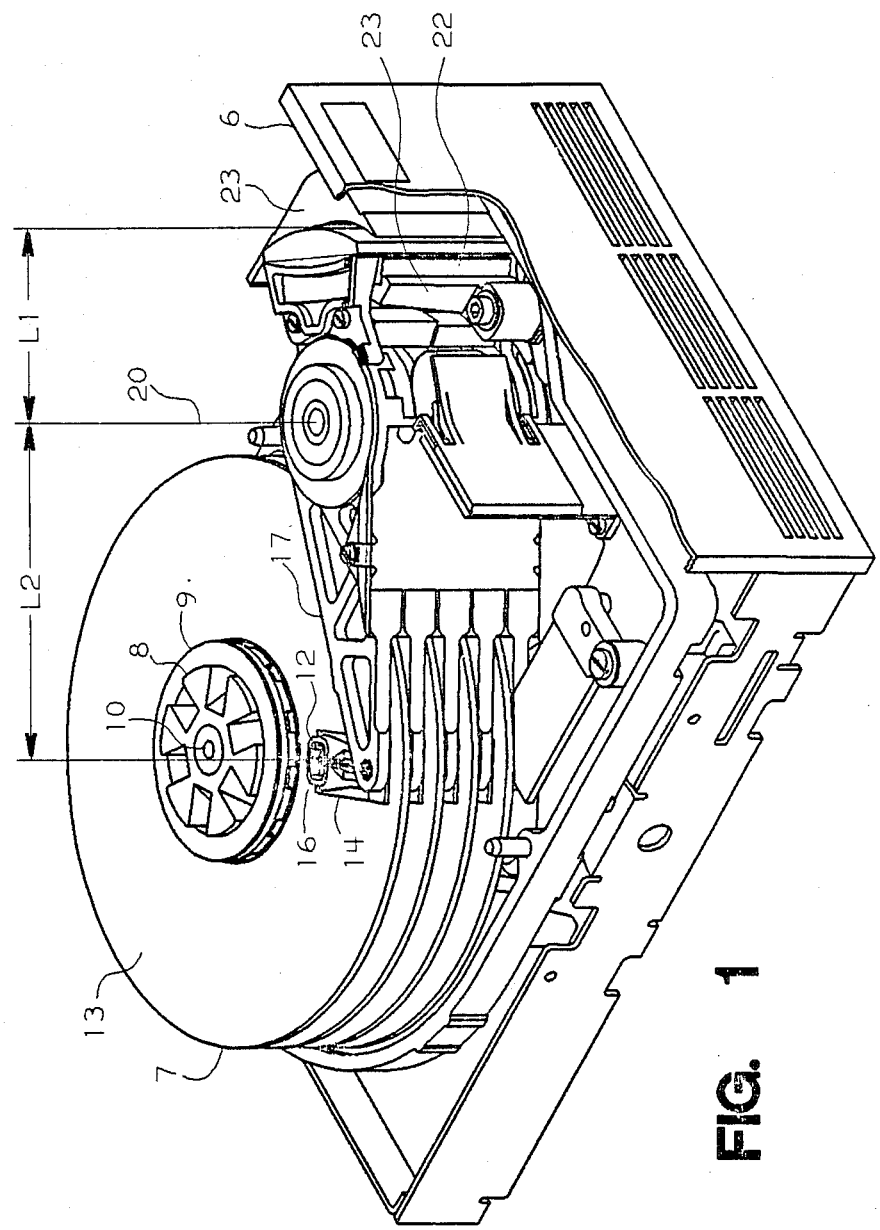
FIG. 1 is a perspective view of a magnetic disk file, with portions removed or broken away, in which the invention is used in the environment of a rotary actuator.

FIG. 1 shows a perspective view of a typical magnetic disk drive with the head-disk enclosure cover removed and the front escutcheon plate 6 partially broken away. The disk drive illustrated includes four disks 7 which are supported on a hub 8, separated by spacers (not shown) and retained by a clamp 9 which is secured by heat shrink retention about the hub. The hub/disk assembly is mounted on a spindle 10 for rotation in unison therewith. A slider 12 with a transducer carried thereby confronts each radially extending disk data surface 13. Each slider 12 is attached to a suspension 14 by a gimbel mounting 16 and each suspension is carried by an actuator arm 17, with the actuator arms extending between disks each carrying two suspensions. The arms 17 are secured together as an assembly that rotates about the axis 20. Actuator motion is generated by a voice coil motor including a stationary assembly of permanent magnets 22 and pole pieces 23 that create a magnetic field within a working gap in which a voice coil, attached to the pivotable actuator assembly, is positioned. The actuator moves in one direction of rotation about the axis when a DC current is passed through the voice coil in one direction and moves in the opposite direction of rotation when the direction of DC current in the voice coil is in the opposite direction.

The voice coil current I is in amperes. The force constant Kf is in units of newtons/ampere. The lever arm L1 from the center of rotation to the center of force and lever arm L2 from the center of rotation to the read/write gap of the servo head are in units of meters. J, in kilogram meters squared, is the rotational inertia of the pivoting actuator assembly. Kpes is the position error signal in volts/meter and Ktach, in volts/meter/second, is the gain which scales the velocity to a desired voltage level.

Actuator motion is generated by passing a DC current through the voice coil that is opposed by the magnetic field created by the permanent magnets 22 mounted on pole pieces 23 adjacent the voice coil. The amount of tangential force induced at the voice coil is the product $I \times Kf$. This force through moment arm L1 is transposed to the servo head through moment arm L2 so the tangential force at the servo head is $I \times Kf \times L1/L2$.

The moment of inertia can be thought of as a point mass at the servo head read/write gap on a massless lever arm. The equation to convert moment of inertia to a point mass is $J/L2^2$. From the equation $F=MA$ (force=mass×acceleration) we see that acceleration of the servo head equals force/mass. So force $(I \times Kf \times L1/L2)$ divided by mass $(J/L2^2)$ equals $I \times Kf \times L1 \times L2/J$.

Since velocity can be obtained by integrating acceleration and position can be obtained by integrating velocity we now have the ability to calculate the amount of movement and rate of movement of once or twice.

Figure 2:
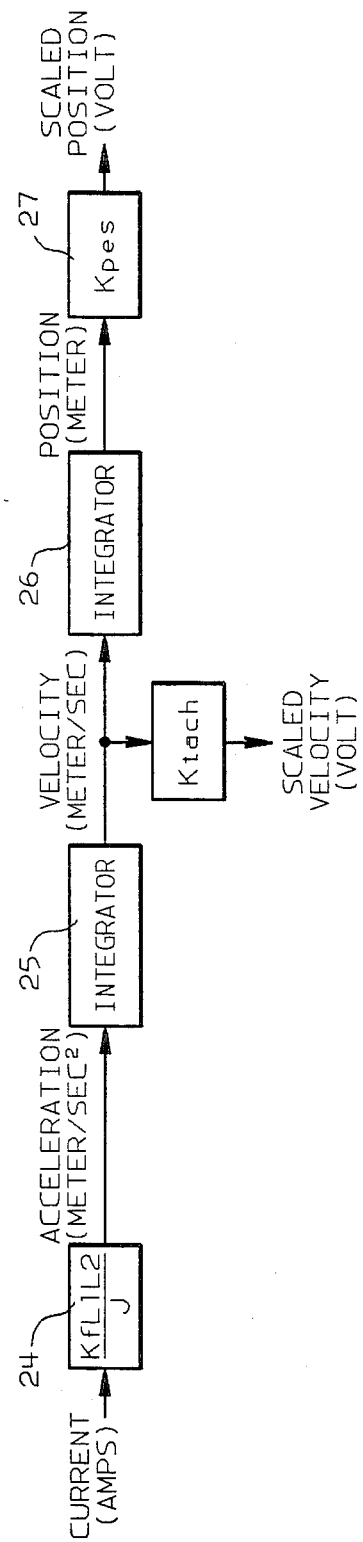
FIG. 2 is a block diagram showing the mathematical identity between the estimator and the actuator.

FIG. 2 is a block diagram showing how this estimator is mathematically the same as the real actuator. Block 24 shows that, with current coming into the block times a constant $(I \times Kf \times L1 \times L2/J)$, a value for acceleration will come out of the block. If the acceleration is integrated, then a value for velocity will be derived from block 25. This velocity can be scaled to any voltage level desired by multiplying by a constant (Ktach). If the velocity is the integrated (block 26), a value for position will be generated. This position value can be scaled at block 27 to any voltage level by multiplying by a constant (Kpes).

Figure 3:
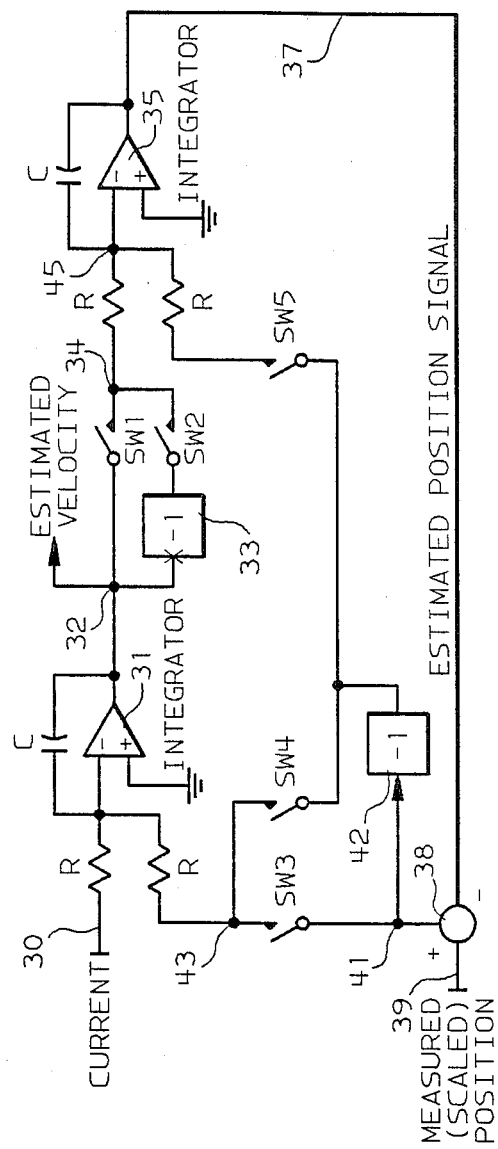
FIG. 3 is a schematic circuit diagram of the estimator.

FIG. 3 shows a more detailed implementation of the estimator including some analog switches that are required for making the estimated position (scaled position signal from the estimator) look like the measured position (actual measured position from the file) signal. The reason for having the estimated position signal appear like the measured position signal is to enable the two signals to be compared and any difference between them used as a feedback to the estimator to help correct for any estimator errors. These errors can come from many sources, including, but not limited to: inaccurate Kf, L1, L2 and J due to manufacturing tolerances; inaccurate Kpes due to variation in the servo head width; inaccurate gains and offsets in the estimator due to electrical parts tolerances; bias forces resulting from windage, cable bias or friction; and noise on the measured position caused by surface defects, resonances or noise pickup.

As shown in FIG. 3, current I is multiplied by gain $(1/r1 \times c1)$ and summed with the error feedback times a feedback gain $(1/r3 \times c1)$ and then integrated to get velocity. The velocity is then either inverted or not inverted depending on the track type and multiplied times gain $(1/r2 \times c2)$ and summed with the error feedback times a feedback gain $(1/r4 \times c2)$. The result is then integrated to get estimated position. Estimated position is then subtracted from measured position to get the error feedback.

Gain $(1/r1 \times c1)$ is the gain which generates acceleration from current. Gain $(1/r2 \times c2)$ is the Kpes gain. Gains $(1/r3 \times c1)$ and $(1/r4 \times c2)$ are the error feedback gains and can be selected using a variety of modern control methods. The objective sought in selecting the choice of feedback gains is to minimize the error between real actuator velocity and estimated velocity. The purpose of the switches in the feedback paths is to make the feedback negative regardless of the track type so that the estimator will be stable.

Digital logic controls the switches in the estimator. Each time the estimated position reaches a predetermined peak value (see the estimated wave form on FIG. 4) a pulse (positive half track or negative half track) is generated which causes the track type (positive or negative PES slope) to switch so that the estimated position integrator will see the opposite polarity and begin integrating in the opposite direction. The measured position may become non-linear at locations between two track centerlines depending on the type servo pattern used (not quadrature). If it does, then the error feedback should be switched off during the non-linear time using switches S3, S4 and S5.

Figure 4:
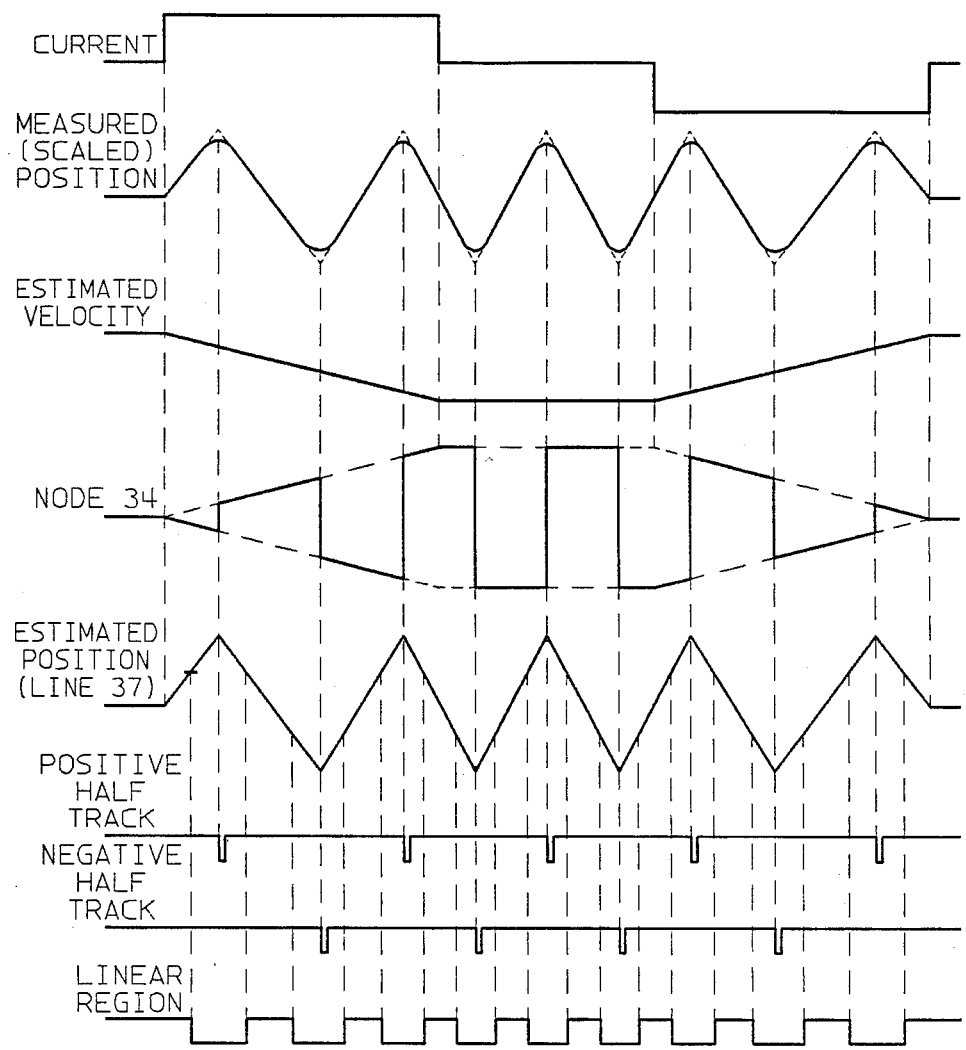
FIG. 4 shows the correspondence between current, velocity and position with traces illustrating the estimated velocity and the pulses that control track type and linear region.

If the current signal of FIG. 4 is negative at the start of a seek, rather than positive as shown, the actuator is moved in the opposite direction of rotation. The estimated velocity then would be the opposite of that shown; rising initially, coasting when the current is off and declining when the current becomes positive to decellerate the actuator to a stop at the target track.

In operation, as viewed in FIG. 3, the current on line 30 is supplied to a first integrator 31 and the integrated result at node 2 provides the estimated velocity value. The estimator, as shown in the environment of a disk file servo system using a dibit servo pattern which produces two track types wherein each track of a first type is adjoined by tracks of the second type. This results in positive and negative signals in successive bands between track centerlines as the transducer is moved by the actuator. Inverter 33 and switches SW1 and SW2 are used to generate a signal at node 34 which allows the estimated position to closely represent the measured position. The modified estimated velocity at node 34 is integrated by the second integrator 35 to produce an estimated position on line 37. A comparator 38 compares the estimated position position signal on line 37 to the measured position (position error signal or PES) on line 39 to produce an error value at node 41.

The error value at node 41 is supplied to switch SW3 and through inverter 42 to switches SW4 and SW5. Switches SW3 and SW4 serve two functions, first to correct for the alternating track types and second to provide a feedback error correcting signal only when the estimated position signal is in the linear region. switch SW3 or switch SW4 is closed in the linear region, depending on which switch is required, in order to assure that the feedback correcting error signal supplied at the summing junction 43 is always negative feedback.

Switch SW5 provides the inverted feedback signal to summing junction 45 when switch SW5 is closed. In FIG. 4, the estimated position is shown as a continuous trace from direction reversal to direction reversal. In actual practice the measured position follows the solid line curve of FIG. 4 with rounded peaks. Accordingly, the only portions of the trace that can be used effectively are the linear portions indicated on FIG. 4 when the linear region signal is "up". It will also be noted that the positive half track pulse and the negative half track pulse are the signals which identify the track types to enable either switch SW1 or switch SW2 and either switch SW3 or switch SW4. The linear region control is effected by switches SW3, SW4 and SW5 which would only be enabled when the linear region signal of FIG. 4 is at an up level.

Although the invention has been shown in the environment of a rotary actuator for a disk file, the same principals and technique would be applicable to a linear actuator which is DC motor driven to move from track to track, or indeed to any environment wherein a DC current driven motor moves an actuator element and an estimated velocity is used for control. It will also be appreciated that the servo signals could employ quadrature to assure the continuous linear output of the feedback error signal.

What is claimed is:

1. In a data disk drive servo positioning system having a DC motor driving an actuator between concentric data track locations, a velocity estimator comprising motor current sensing means for deriving a first signal proportional to motor current;

measured position sensing means for deriving a position error signal (PES) representative of actuator position relative to said concentric track;

first integrating means for integrating said first signal to generate an estimated velocity;

second integrating means for integrating said estimated velocity to generate an estimated position;

comparison means for comparing said PES and said estimated position and generating an error signal representative of the diference therebetween; and feedback means for providing a closed loop to feedback said error signal to correct said estimated velocity;

said feedback means comprising circuit means for supplying said comparison means error signal to the input of both said first integrator means and said second integrator means.

2. The data disk drive velocity estimator of claim 1 wherein said feedback means further comprises inverter means and switch connected to assure that the feed back signal is negative.

3. Tha data disk drive velocity estimator of claim 1 wherein parallel circuit paths extend between said first integrator means and said second integrator means with invertor means in one of said parallel circuit paths and further comprising first and second switch means respectively in said parallel circuit paths, said first and second switch means being alternately, but not simultaneously closed.

4. A system for controlling the position or velocity of an electrically current driven actuator comprising first sensing means for sensing a signal proportional to motor current;

second sensing means for sensing measured position of said actuator;

first integrator means for integrating said signal proportional to motor current to generate an estimated velocity;

second integrator means for integrating said estimated velocity to generate an estimated position;

comparison means for comparing said estimated position and said measured position and generating an error signal representative of the difference therebetween; and feedback means for feeding back said error signal to correct said estimated velocity, said error signal from said feedback means being connected to the input of both said first integrating means and said second integrating means.

5. The system of claim 4 wherein the error signal from said feedback means is connected to both said first integrating means and said second integrating means.

6. The system of claim 5 wherein said feedback means comprises switch means and inverter means connected to said comparison means to provide a negative feedback to the input of said first integrating means.

7. The system of claim 5 further comprising switch means connected between said comparison means and said first and second integrator means to interrupt said feedback error signal when such signal is derived from non-linear portions of the estimated position signal.

* * * * *